United States Patent [19]
Zachau-Christiansen et al.

[11] Patent Number: 5,616,309
[45] Date of Patent: Apr. 1, 1997

[54] VANADIUM OXIDE-BASED CATHODE ACTIVE MATERIAL AND METHOD OF MAKING SAME

[75] Inventors: Birgit Zachau-Christiansen, Espergaerde; Keld West, Hellerup, both of Denmark

[73] Assignee: Valence Technology, Inc., Henderson, Nev.

[21] Appl. No.: 566,232

[22] Filed: Dec. 1, 1995

[51] Int. Cl.$^6$ ............................................ C01B 13/14
[52] U.S. Cl. ..................... 423/592; 423/594; 429/218; 429/221
[58] Field of Search .................... 429/218, 221; 423/592, 594

[56] References Cited

U.S. PATENT DOCUMENTS

| | | |
|---|---|---|
| 3,372,122 | 8/1964 | Lessoff . |
| 3,479,132 | 8/1967 | Wickham . |
| 4,243,624 | 1/1981 | Jacobson et al. . |
| 5,013,620 | 5/1991 | Miyazaki et al. . |
| 5,028,348 | 7/1991 | Konoike et al. . |
| 5,039,582 | 8/1991 | Pistoia . |
| 5,286,582 | 2/1994 | Tahara et al. ............ 429/218 |
| 5,336,572 | 8/1994 | Koksbang ............... 429/218 |

OTHER PUBLICATIONS

K. West, B. Zachau–Christiansen, T. Jacobsen, and S. Skaarup, "Sodium Insertion in Vanadium Oxides", Solid State Ionics, 28–30, 1128–1131, 1988 (month N/A).

K. West, B. Zachau–Christiansen, T. Jacobsen, and S. Skaarup, "Layered Potassium Vanadium Oxides as Host Materials for Lithium and Sodium Insertion", Solid State Ionics, 40/41, 585–588, 1990 (month N/A).

B. Zachau–Christiansen, K. West, T. Jacobsen, and S. Skaarup, "Lithium Insertion in Isomorphous MO$_2$(B) Structures", Solid State Ionics, 53–56, 364–369, 1992 (month N/A).

*Primary Examiner*—M. Nuzzolillo
*Attorney, Agent, or Firm*—Linda M. Deschere

[57] ABSTRACT

The present invention provides cathode active materials having as their major component or consisting essentially entirely of an oxide of vanadium of one of the nominal general formulas: $Li_aFe_xV_yO_z$ and $Li_mFe_xV_yO_z$. In the case of $Li_aFe_xV_yO_z$ the material in an initial condition does not contain any lithium so a is equal to 0. In the case of $Li_mFe_xV_yO_z$ the material in an initial condition contains lithium so m is greater than 0. In both cases, x is about 1, y is about 3, and z is about 8. In both cases, the V(4) state is achieved by reaction between iron and V(5) in vanadium pentoxide. In one case lithium was added by including lithium hydroxide in an aqueous solution containing the iron and the vanadium pentoxide.

21 Claims, 4 Drawing Sheets

VANADIUM OXIDE-BASED CATHODE ACTIVE MATERIAL AND METHOD OF MAKING SAME

FIELD OF THE INVENTION

This invention relates to a cathode active material and cathodes for electric current producing and storage cells and method of making of same.

BACKGROUND OF THE INVENTION

Cells and batteries based on metals such as those having an alkali metal-containing anode (negative electrode) and compatible cathode (positive electrode) are known. Particularly favored are such cells comprising a lithium foil anode active material of a thickness of about 75 microns, or a composite intercalation anode layer of the same thickness. Also favored is an intercalation cathode layer of a thickness similar to the anode and which contains finely divided transition metal oxide active material, electrically conductive carbon, and a solid electrolyte material. An electrolyte layer having a thickness of about 25 microns is positioned between the anode and the cathode and often comprises an ion conducting polymer such as polyethylene oxide complexed with an ionizable alkali metal salt. The electrolyte layer separates the anode and cathode from one another while providing transport of ions between the anode and cathode. Typically, a current collector of conductive metal is positioned on the sides of both of the electrodes away from the electrolyte layer.

Processes for making electrochemical cells containing alkali metal active material and components of such cells are generally described in U.S. Pat. No. 5,011,501 to Shackle and U.S. Pat. No. 4,935,317 to Fauteau and Shackle. Each of these patents are incorporated in its entirety herein.

Lithium based cells or batteries are particularly favored and often comprise cathodes of the aforementioned transition metal intercalation compounds. The intercalation reaction involves the interstitial introduction of a guest species, namely, lithium into the host lattice of the transition metal oxide, essentially without structural modification of the host lattice. Such intercalation is essentially reversible because suitable transition states are achieved for both the forward and reverse of the intercalation action. The basic components of a lithium cell typically include a lithium containing anode, a separator, and a metal oxide intercalation cathode active material such as vanadium oxide also referred to as vanadates or vanadate compounds. The cathode is usually a mixture of such oxide compounds and other aforementioned components such as graphite and an electrolyte binder which provide electronic and ionic transport. During cell operation, incorporation of lithium in the metal oxide occurs. Some vanadates have high initial capacities, which, however, rapidly decline especially in the first cycles. Many metal oxides are prepared in a complex process by mixing precursor components containing an alkali metal with vanadium pentoxide and then baking the mixture to a sinter or melt temperature in the range of about 600° C. to 800° C. to cause formation of the product. The high temperature product of this process is then cooled and ground up into a powder. Such high temperature melt and sintering processes have certain disadvantages because it is difficult to handle molten or sintered metal oxides at high temperatures and special procedures are required. In addition, there is a reaction between the molten product and the containers used for conducting the reaction which thereby causes contamination of the product; and a significant amount of mechanical energy is required to grind the cooled solidified products to form a powder for inclusion in a cathode composition of an electrochemical cell. Despite these difficulties, high temperature melt or sintering processes such as described in U.S. Pat. No. 5,013,620 continue to be used to obtain positive electrode active material, such as $LiV_3O_8$. Recently, it has been suggested to form vanadium oxide compounds by reaction of a precursor oxide with an alkali hydroxide such as LiOH (U.S. Pat. No. 5,039,582 to Pistoia). Still despite the many available compounds and methods, it is desirable to have a new active material which has a high specific energy, high cycle life, and high rate capabilities; and a method for preparing such active material which is relatively simple and economical, which does not require handling metal oxide constituents in a high temperature sintered or molten state, and which achieves good conversion of the starting materials to the final metal oxide product.

The present invention provides cathode active materials having as their major component or consisting essentially entirely of an oxide of vanadium of one of the nominal general formulas: $Li_aFe_xV_yO_z$ and $Li_mFe_xV_yO_z$. In the case of $Li_aFe_xV_yO_z$ the material in an initial condition does not contain any lithium so a is equal to 0. In the case of $Li_mFe_xV_yO_z$ the material in an initial condition contains lithium so m is greater than 0. In both cases, x is about 1, y is about 3, and z is about 8 corresponding to a trivanadate $MV_3O_8$ unit structure. Importantly, the active material is prepared with at least a portion of the vanadium in the V(4) state. This means at least a portion of the vanadium is in the plus 4 (+4) state.

In an as prepared form or initial first condition the $Li_aFe_xV_yO_z$ contains no lithium; when electrochemically reduced, fully or partially discharged to a second condition the amount of lithium increases to a value of up to about 4 so that a varies between a is equal to 0 and a is less than or equal to 4 ($0 = a \leq 4$).

In the case of the material of the formula $Li_mFe_xV_yO_z$, in an initial first condition as prepared, it contains some lithium so that m equals m1 and m1 is greater than 0; when electrochemically reduced, fully or partially discharged to a second condition, m equals m2 and m2 is greater than m1 and is up to about 4; and when electrochemically oxidized, fully or partially charged to a third condition, m equals m3 and m3 is less than m1. In an initial first condition as prepared m1 is close to or about equal to 1. In the oxidized fully or partially charged condition m3 is close to or about equal to 0. Preferably in said respective conditions m1 is 1 and m3 is 0. Importantly, it is possible to insert up to about 4 equivalent atoms of Li per equivalent unit of $V_3$.

The active material of the invention provides surprising capacity increase under certain conditions. In an initial as prepared condition, the material has the constituents in the atomic ratios presented. However, the lithium initially present in the material can be removed by charging to 4.25 V either after the cell has been discharged or before cycling of the cell. In this way, the capacity increases upon further cycling and capacity is increased to at least 4 Li per $V_3$. Most cells show a slightly increasing capacity during the first 5-10 cycles. The upper limit to the lithium insertion is not known but it is greater than 4 Li per $V_3$ and may be as great as 4.5 Li per $V_3$ and may be less than 5. In order to avoid confusion, the reference character "n" will be used in place of "m" to describe the state of the active material. Accordingly, $Li_mFe_xV_yO_z$ and $Li_nFe_xV_yO_z$ are the same in an as prepared condition. In an initial condition n is n1 and n1 is greater than 0; in a charge to remove Li (i. e., 4.25 V) n is n2 and n2 is less than n1; in a subsequent discharge n is n3 and n3 is greater than n1. Upon further charge and discharge the value of n3 increases, and it may be greater than 4 Li per $V_3$ unit.

Preferably, the vanadium oxide based active materials of the invention ($Li_aFe_xV_yO_z$, $Li_mFe_xV_yO_z$) are prepared for use in cells with an anode active material made of lithium or a compound or alloy which includes lithium. The cells also include an electrolyte which is electrochemically stable with respect to the cathode active material and the lithium, and which allows lithium ions from the anode (negative electrode) to move through the electrolyte to react electrochemically with the cathode (positive electrode) active material of the invention. The electrolyte may be liquid, solid, polymeric and in the case of a liquid electrolyte, typically includes a separator. A preferred lithium cell comprises the positive electrode active material of the invention, a negative electrode which is metallic lithium, and an electrolyte which is in the form of a polymeric network containing an electrolyte solution comprising a metal salt of lithium.

In one embodiment, the cathode active material of the nominal general formula $Li_aFe_xV_yO_z$ with a equal to 0 corresponding to $Fe_xV_yO_z$ is prepared in a series of steps. In the first step, a mixture comprising a liquid; metallic iron particles; and vanadium pentoxide containing vanadium in the plus 5 (+5) state is prepared with the relative amounts of 1 mole of iron for every 1½ moles of the vanadium pentoxide. The metallic iron is reacted with the vanadium pentoxide in the presence of oxygen to change at least a portion of the V(5) to a V(4) state and to form a greenish/black gel containing the oxide of vanadium in the V(4) state. By this means, reduction of V(5) with metallic iron in solution to V(4) is achieved. In the next step of the process the liquid is separated from the mixture containing the oxide-based gel to provide a solid material comprising iron, vanadium, and oxide in a crystal structure corresponding to a trivanadate and having at least a portion of the vanadium in the V(4) state. Further characterization of the product reveals that depending on the preparation method the solid material product comprises the oxide of the crystal structure described above having at least a portion of the vanadium in the V(4) state and one or more of particles of iron and particles of vanadium pentoxide may also be present. It is preferred that all of the iron and $V_2O_5$ be reacted so that there are no free particles of either in the product.

It is preferred that the reaction step be conducted in a range of up to about the boiling point of the mixture or liquid in the mixture and preferably no less than about room temperature (i.e., 10° C.). The reaction may be conducted in a range of 50° C. to 90° C. with about 80° C. being preferred.

It is preferred that the liquid in the mixture be water and that the step of separating the liquid from the oxide solid material be conducted by freeze-drying by cooling the water to a temperature below its freezing point under subatmospheric pressure for a time sufficient to remove at least a portion if not essentially all of the water. In order to remove virtually all of the water it is preferred that the step of freeze-drying be followed by calcining where the calcining is conducted at a temperature of at least about 200° C. It is preferred that the source of oxygen for the reaction be from water or air. It should be noted that the relative proportions of constituents in the final product may be slightly different from the $V_3O_8$ values. Although the relative proportions of Fe to V to O in the final product are nominally 1 to 3 to 8, chemical analysis of the product formed by the method described above revealed $Fe_{0.99}V_3O_{8.16}$. Accordingly, the value of oxygen ranges between about 7.8 and 8.2 and the value of iron is somewhat less than 1 and maybe somewhat greater than 1 within about the same range of variation as for the aforesaid oxygen.

In another embodiment of the invention an iron containing vanadium oxide of the nominal general formula $Li_mFe_xV_yO_z$, is prepared having a proportion of Li to Fe to V to O of approximately 1 to 1 to 3 to 8. Importantly, the product contains at least a portion of the vanadium in the V(4) state. The product showed some ferromagnetism, therefore, the solid product is thought to be a ferrite vanadium oxide product or a mixture of constituents, including $LiV_3O_8$ having at least a portion of the vanadium in the plus 4 state and metallic iron. This product was prepared according to the general procedure described hereinabove with the additional step of introducing into the mixture lithium from the hydroxide while at the same time taking care to prevent re-oxidation of the vanadium by conducting the process under an inert atmosphere. The inert gas is a gas which is inert with respect to the components of the mixture and does not react with components of the mixture. A suitable gas is nitrogen, argon, helium, and the like. The formation of this product began with preparing a mixture comprising a liquid; metallic iron particles; vanadium pentoxide containing vanadium in the V(5) state; and lithium hydroxide. In this mixture, the metallic iron, the vanadium pentoxide, and the lithium hydroxide are reacted to change at least a portion of the V(5) to a V(4) state and to provide a gel containing the oxide of vanadium having vanadium in the V(4) state. Next, the liquid is separated from the oxide based gel to provide a solid material comprising iron, lithium, vanadium, and oxygen and having a crystal structure corresponding to a trivanadate structure with at least a portion of the vanadium in the V(4) state. It was determined that the reaction was complete when a blackish gel was produced and little or virtually no metallic particles of iron were observable. The gel was freeze dried and calcined as described above.

On calcining, the product becomes ferromagnetic indicating the presence of free iron in the final product.

The vanadium oxide products of the invention are generally in the form of porous lumps which are easily friable to a powder having surprisingly small particle size on the order of 1 micron. The products were tested in a cell to determine the behavior of specific capacity during charge and discharge and showed markedly improved characteristics as compared to conventionally known vanadates.

It is an object of the invention to provide a new method for preparing metal oxide positive electrode active materials for a lithium or alkali metal battery. Another object is to provide a lithium or alkali metal battery having good charge/discharge capacity. Another object is to provide an improved electrochemical battery based on lithium or an alkali metal which maintains its integrity over prolonged life cycle as compared to presently used batteries. Another object is to provide a vanadate based active material which is relatively cheap, easy to prepare, with a high specific energy, high life cycle, and high rate capability. Another object is to provide good conversion of the starting materials to the metal oxide products. These and other objects, features, and advantages will become apparent from the following description of the preferred embodiments, claims, and accompanying drawings.

BRIEF DESCRIPTION OF THE DRAWINGS

In FIGS. 3 and 4 from an as prepared condition the active material is cycled to a reduced fully or partially discharged second condition where m is m2 and m2 is greater than m1 and then electrochemically oxidized fully or partially charged to a third condition were m is m3 and m3 is less than m1 . In FIGS. 5 and 6 either after the cell has been discharged or before cycling of the cell any lithium initially present is removed by charging to a condition of m is 0 or very close to 0 corresponding to approximately 4.25 V and then thereafter cycled between discharge and subsequent charge conditions where the upper limit of the amount of lithium capable of being inserted increases upon subsequent charge and discharge and is greater than 4 Li+ per $V_3$ unit.

DETAILED DESCRIPTION OF THE PREFERRED EMBODIMENTS

The iron-containing trivanadate unit structure composition of the invention and the Li-containing, Fe-containing, $V_3O_8$, unit structures of the invention are able to insert lithium in, and release it from, the basic structure with good energy, power, and cycling capability. The method of the invention will first be described with reference to the preparation of $FeV_3O_8$ and then to the preparation of Li:Fe:V:O formulation of 1:1:3:8.

In the case of $Li_aFe_xV_yO_z$ the material in an initial condition does not contain any lithium so a is equal to 0. In the case of $Li_mFe_xV_yO_z$ the material in an initial condition contains lithium so m is greater than 0. In both cases, x is about 1, y is about 3, and z is about 8 corresponding to a $V_3O_8$ unit structure. Importantly, in both cases, the active material is prepared with at least a portion of the vanadium in the V(4) state. This means at least a portion of the vanadium is in the plus 4 (+4) state.

In the case of the material of the formula $Li_mFe_xV_yO_z$, in an initial first condition as prepared, it contains some lithium so that m equals m1 and m1 is greater than 0; when electrochemically reduced, fully or partially discharged to a second condition, m equals m2 and m2 is greater than m1 and is up to about 4; and when electrochemically oxidized, fully or partially charged to a third condition, m equals m3 and m3 is less than m1 . In an initial first condition as prepared m1 is close to or about equal to 1. In the oxidized fully or partially charged condition m3 is close to or about equal to 0. Preferably in said respective conditions m1 is 1 and m3 is 0. Importantly, it is possible to insert up to about 4 equivalent atoms of Li per equivalent unit of $V_3$.

The active material of the invention provides surprising capacity increase under certain conditions. In an initial as prepared condition, the material has the constituents in the atomic ratios presented. However, the lithium initially present in the material can be removed by charging to 4.25 V either after the cell has been discharged or before cycling of the cell. In this way, the capacity increases upon further cycling and capacity is increased to at least 4 Li per $V_3$. Most cells show a slightly increasing capacity during the first 5 to 10 cycles. The upper limit to the lithium insertion is not known but it is greater than 4 Li per $V_3$ and may be as great as 4.5 Li per $V_3$. In order to avoid confusion, the reference character "n" will be used in place of "m" to describe the state of the active material. Accordingly, $Li_mFe_xV_yO_z$ and $Li_aFe_xV_yO_z$ are the same in an as prepared condition. In an initial condition n is n1 and n1 is greater than 0; in a charge to remove Li (i.e., 4.25 V) n is n2 and n2 is less than n1 ; in a subsequent discharge n is n3 and n3 is greater than n1 . Upon further charge and discharge the value of n3 increases, and it may be greater than 4 Li per $V_3$ unit.

EXAMPLE 1

The $FeV_3O_8$ is prepared in a solution process by reduction of V(5) with metallic iron. An aqueous solution is preferred. The process begins with forming a mixture comprising water, vanadium pentoxide, and metallic iron each in an amount sufficient to provide approximately the desired stoichiometric amount of elements in the final product. Oxygen is included during the process and the source is thought to be either the ambient air or water. The overall reaction may be represented as follows:

$$Fe+1.5V_2O_5=FeV_3O_8.$$

Metallic iron powder was dispersed in water of a temperature of about 80° C. then $V_2O_5$ powder was slowly added over about a 4 day period with periodic mixing. The proportions of iron and vanadium pentoxide were in the molar ratios stated above. A green gel was obtained which was freeze dried and subsequently calcined at 24 hours at about 350° C. More specifically, the procedure involved the use of 4.1 grams of $V_2O_5$ corresponding to approximately 0.0228 mole and 0.84 grams of (0.015 mole) iron fine powder. These were added to about 100 milliliters of water and reaction was conducted at a temperature of approximately 80° C. for 7 days. The resulting greenish/black gel was freeze-dried and then calcined. The product was analyzed for Fe and V and reducing power quantified as the average oxidation number of vanadium. (Table I.)

TABLE I

CHEMICAL ANALYSIS OF "$FeV_3O_8$" PREPARED BY GEL ROUTE

| | |
|---|---|
| Eqw/Fe: | 371 ± 12 g/eq |
| Eqw/V: | 122.9 ± 0.5 g/eq |
| V (ox)*: | 4.44 ± 0.01 |
| Overall Formula: | $Fe_{0.99}V_3O_{8.16}$ |
| Purity: | 92% |

*$Fe^{+3}_{0.99}V^{+5}_{1.32}V^{+4}_{1.68}O_{8.16}$
1. 3 × 4.44 = 13.32
2. x(+5) + y(+4) = 13.32; and y = 3 − x
3. 1.32 = x
4. $Fe^{+3}_{0.99}V^{+5}_{1.32}V^{+4}_{1.68}O^{-2}_{8.16}$

TABLE II

CHEMICAL ANALYSIS OF "$LIFEV_3O_8$" PREPARED BY GEL ROUTE

| | |
|---|---|
| Eqw/Fe: | 371 ± 0.6 g/eq |
| Eqw/V: | 115.6 ± 0.2 g/eq |
| V (ox)**: | 4.104 ± 0.009 |
| Eqw/Li: | 419 ± 5 g/eq |
| Overall Formula: | $Li_{0.84}V_3Fe_{0.93}O_{7.97}$ |
| Purity: | 97.5% |

Figure 1:
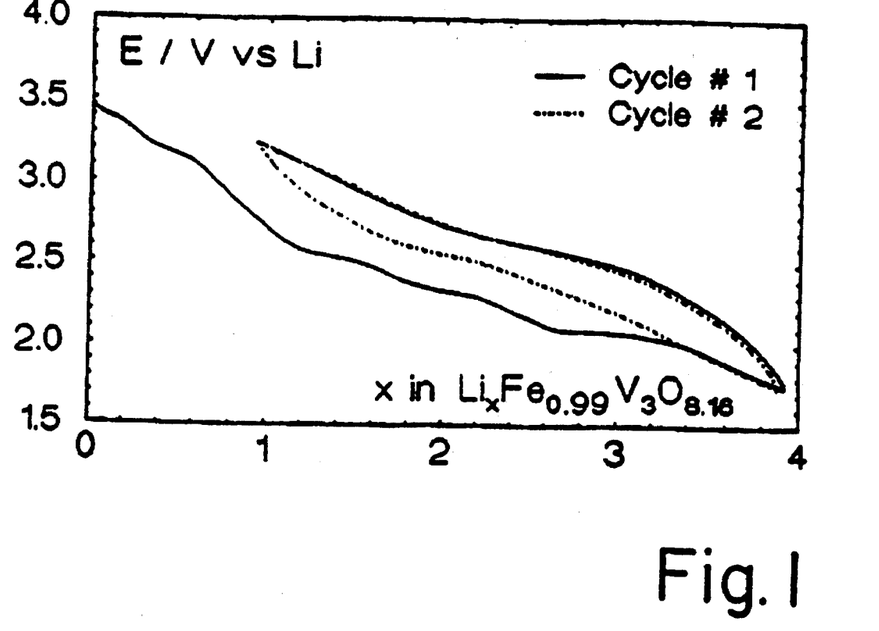
FIGS. 1 and 2 show voltage curves for cathodes having the $Li_aFeV_3O_8$ composition of Example 1 with a equals 0 in an initial, as prepared condition, and with a ranging up to 4 inserted Li plus (Li+) per $V_3$ unit when cycled in a cell. The first 2 cycles are shown for the cell: Li/LiCF$_3$SO$_3$/PEO/Li$_x$FeV$_3$O$_8$ (100° C.); current: 40µ A/cm$^2$; rate: x/10 hr.
Figure 2:
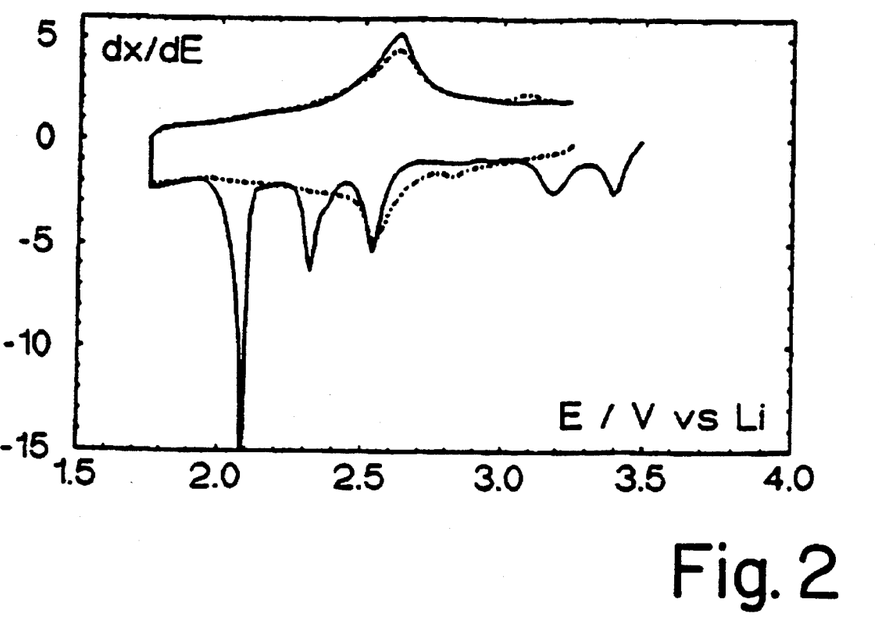

**$Li^{+1}_{0.84}V^{+5}_{0.31}V^{+4}_{2.69}Fe^{+3}_{0.93}O_{7.97}$
1. 3 × 4.104 = 12.31
2. x(+5) × y(+4) = 12.31; and y = 3 − x
3. .31 = x
4. $Li^{+1}_{0.84}V^{+5}_{0.31}V^{+4}_{2.69}Fe^{+3}_{0.93}O^{-2}_{7.97}$ X-ray diffraction showed only a few weak lines originating from $FeV_3O_8$ a major part of the spectrum could be indexed as a mixture of $V_2O_5$ and metallic iron. This material was cycled in $LiCF_3SO_3$/PEO and in a PC based electrolyte. The voltage curves (FIGS. 1 and 2) are very similar to that of $V_2O_5$ except that the capacity peaks at approximately 2.6 volts which is thought to be typical of this $FeV_3O_3$ product. It should be noted that the differential capacity data are more sensitive to structural details than the x-ray data appeared to be. By discharge to 1.8 volts versus Li, a capacity of about 275 Ah or 673 Wh/kg is obtained. More than 75% of the capacity was retained in the second cycle (at about 100° C.). The cycling performance in both electrolytes are similar to $V_2O_5$. Deep discharge leads to amorphisation of the host oxide but it still has fair cycling properties.

The starting materials are available from a number of sources. The following are typical. Vanadium pentoxide of the general formula $V_2O_5$ is obtainable from any number of suppliers including Kerr McGee, Johnson Matthey, or Alpha Products of Davers, Massachusetts. It had a melting point of about 690° C., decomposed at 1750° C., a particle size of less than about 60 mesh (250 microns) and had a specific gravity of 3.357 grams per cc at 18° C. It was a yellow-red crystalline powder. Vanadium pentoxide has a CAS number of 1314-62-1.

Alternatively, the vanadium pentoxide may be prepared from ammonium metavanadate ($NH_4VO_3$). The ammonium metavanadate is heated to a temperature of about 400° C. to about 450°C. to decompose it to vanadium pentoxide ($V_2O_5$), usually in a crystalline form (in the presence of oxygen). The ammonium metavanadate is a solid crystalline material, usually a white to yellow powder. Processes for production of ammonium metavanadate are known in the art and will not be repeated here. Such processes are described in U.S. Pat. Nos. 3,063,795 and 3,063,796; and processes for preparation of ammonium metavanadate and then for production of vanadium pentoxide therefrom are described in U.S. Pat. Nos. 3,728,442, 4,061,711 and 4,119,707, each of which is incorporated herein by reference in its entirety.

The powdered metallic iron having particles of iron of an average or median size of about 2 microns to about 20 microns are obtainable from any number of suppliers. The metallic iron used in the process of the invention was obtained from Merck and had a median particle size (diameter) of about 10 microns.

EXAMPLE 2

The preparation procedure described above in Example 1 was modified in order to make an oxide having the constituents lithium, iron, vanadium, and oxygen in a ratio of Li:Fe:V:O of 1:1:3:8. In the modification of the procedure of Example 1 lithium was introduced into the gel as lithium hydroxide, and, to prevent re-oxidation of vanadium, the gelation process was performed under a nitrogen atmosphere. The reactants used were as follows: 8.19 grams of $V_2O_5$ corresponding to 0.0455 mole, 1.67 grams of Fe powder corresponding to 0.0299 mole, and 0.72 grams of lithium hydroxide corresponding to 0.030 mole. Lithium hydroxide (LiOH) is a granular powder, described in the Merck Index 10th Ed. at #5360. It readily absorbs $CO_2$ and water from air and should be kept tightly closed until used. It is soluble in water. The overall reaction may be represented as follows:

$1\ Fe+1LiOH+1.5V_2O_5=LiFeV_3O_8$.

In this Example the constituents were combined in about 100 milliliters of water as the solvent. The vanadium pentoxide and the lithium hydroxide were first heated in the water with reflux and $N_2$ bubbling. Next, the iron powder was added and the mixture was digested at about 82° C. for 4 days. At this time the gel was blackish and only a small amount of iron powder was left on the stirring magnet indicating that substantially all of the iron powder had participated in the reaction or interaction with the V(5). The gel was freeze dried and then heated to 250° C. overnight. The product was analyzed for lithium, iron, vanadium, and reducing power (quantified as the average oxidation state of vanadium; see Table II). X-ray diffraction showed lines that could be indexed as a mixture of $LiV_3O_8$ and metallic iron. The product showed ferromagnetism.

Figure 3:
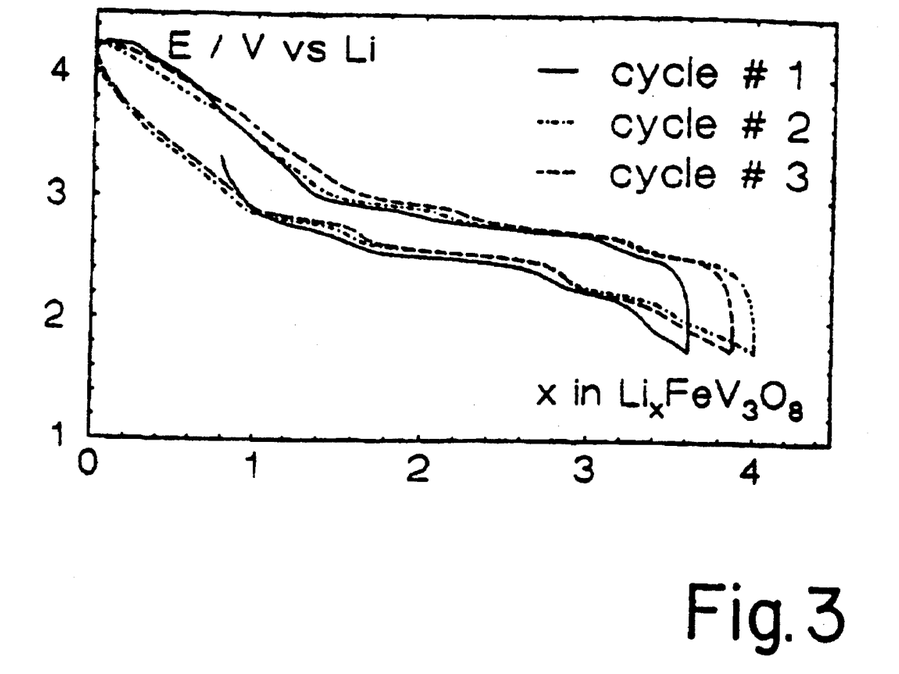
FIGS. 3 and 4 and 5 and 6 show voltage curves for cathodes having the $Li_mFeV_3O_8$ composition of Example 2 with m greater than 0 in an initial condition as prepared. The cell being cycled is Li/DEC-EC electrolyte/LiFeV$_3$O$_8$; current is 32µ A/cm$^2$.
Figure 4:
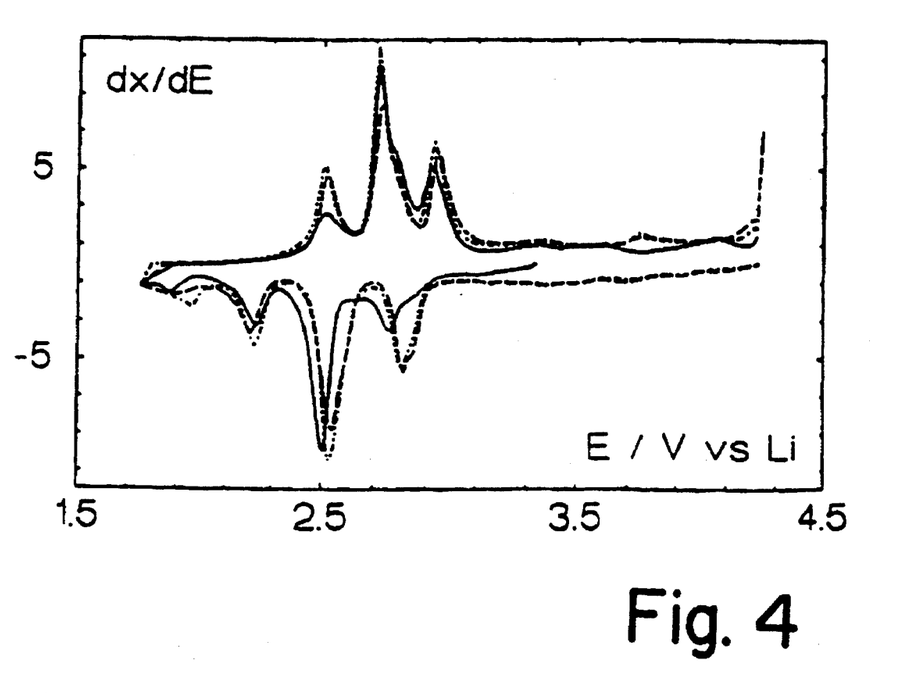
Figure 5:
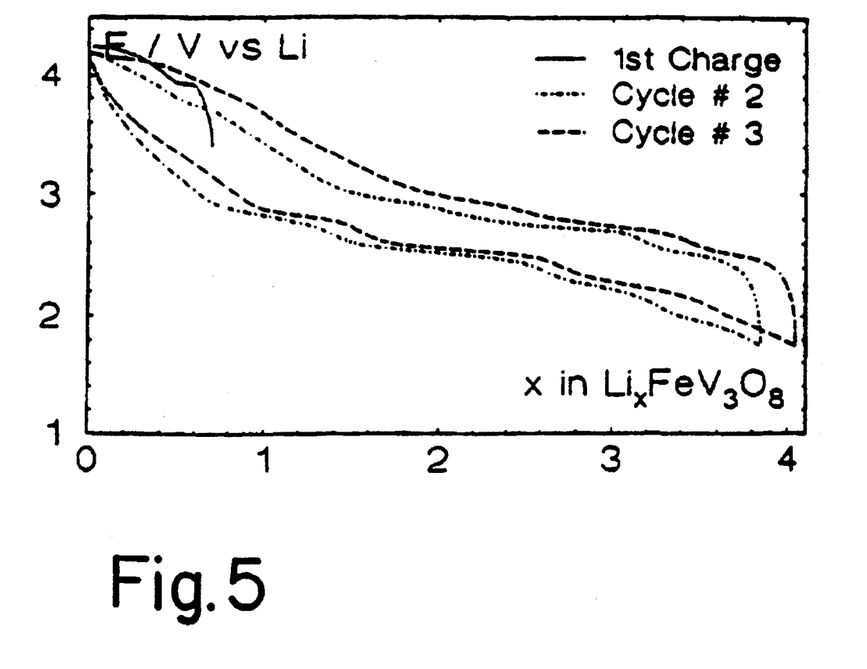
Figure 6:
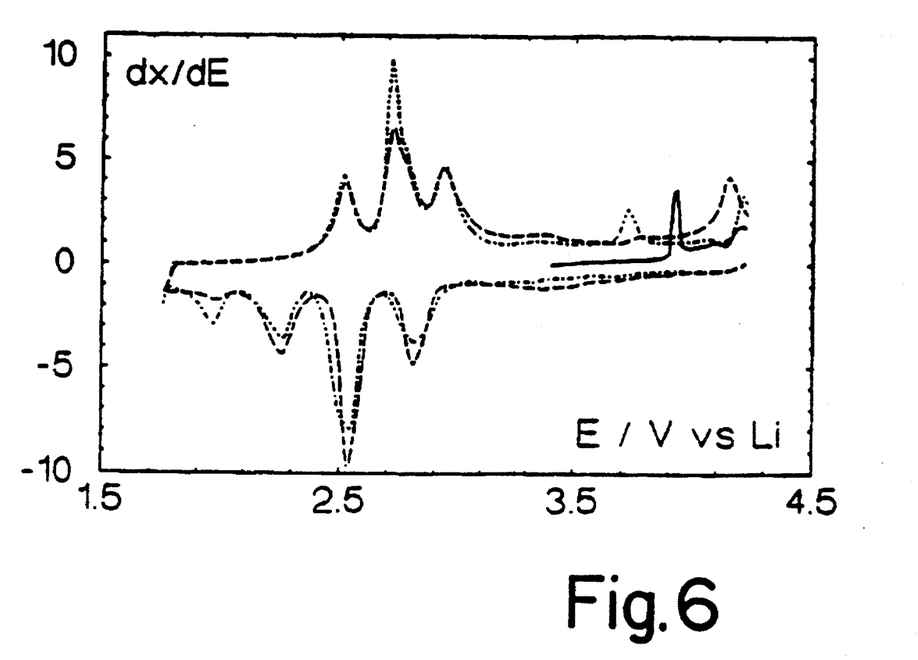

This material was cycled in DEC-EC electrolyte. Discharge from the initial composition down to 1.75 volts proceeded very similarly to the discharge of $LiV_3O_8$, but as can be seen from FIGS. 3 and 4 the peaks are broader and the peak at approximately 2.8 volts is relatively larger. The main difference is, however, that the lithium initially present in this material can be removed by charging to 4.25 volts—either after the cell has been discharged or before cycling of the cell. (FIGS. 5 and 6) In this way the capacity is increased to at least 4 equivalent atoms of lithium per equivalent unit of $V_3$. Most cells showed a slightly increase in capacity during the first 5 to 10 cycles, and the limiting lithium composition interval is not known exactly. It is unclear how the free iron can have this effect but it apparently takes part in the redox processes. The stoichiometric energy density based on 4 Li per $V_3$ and the formula weight determined from chemical analysis is 725 Wh/kg.

As per the Examples, the preferred liquid n the mixture is water and the step of separating the liquid from the oxide solid is by freeze-drying conducted under a vacuum at an absolute pressure of less than 0.1 millimeter of mercury (mm Hg Abs), desirably less than 0.03 mm Hg Abs, and preferable less than 0.01 mm Hg Abs. When water is used as the liquid in the mixture the temperature at which freeze-drying takes place is at 0° C. or less, for example, –10° C. or less. Desirably, the temperature is –20° C. and preferably is in the range of –20° C. to about –60° C. A suitable range is –30° C. to –50° C. The conditions under which freeze-drying occurs may vary, the basic requirement is that the wet mixture be freeze dried by bringing the wet mixture to a temperature below the freezing point of the liquid (volatile constituent) under a vacuum, thereby providing separation of the liquid from the solid product. In order to remove virtually all of the water it is preferred that the step of freeze-drying be followed by calcining where the calcining is conducted at a temperature of at least about 200° C.

The process of freeze-drying is a special case of sublimation. In the process of the invention, water is the volatile constituent to be removed, although the wet mixture may include other components. During the process, water in the frozen or solid state, is sublimed and is removed or separated from the oxide directly as a vapor. Since the vapor pressure of ice is considerably below atmospheric pressure, freeze-drying requires high vacuum.

The equipment necessary to accomplish freeze-drying depends on the quantity of material being freeze-dried. If a flask is used, the wet mixture may be frozen in the flask in a refrigerated bath or a dry ice-methanol bath. In the Examples, a refrigerated bath was used. The frozen matter (i.e. water) is driven off for a sufficient period of time under a vacuum using a vacuum pump. The freeze-drying is continued until the moisture content is reduced to a sufficient level, for example, on the order of 10% to 20% by weight or less. Depending on the solid concentration of the wet mixture and the degree of dryness required, the process may take more than an hour. In the Examples, the initial temperature for freeze-drying was about –40° C., and should probably not exceed –20° C. As long as the conditions are right for freeze-drying, the temperature will be maintained at a sufficiently low value by loss of heat during evaporation of solvent (water), but it was not followed during the preparations of the Examples.

In various experiments, the LiOH lithium hydroxide was dissolved in the water and heated and then the vanadium pentoxide was added gradually. It is probably possible to prepare the mixtures with greater concentrations of powder constituents to water. Similarly, it is possible to increase the concentrations higher than in the representative examples. It is thought that better results will occur at lower concentrations. However, the correlation between concentration and particle size of the product or the friable product is not well understood.

It is thought that part of the vanadium pentoxide dissolves in solution, followed by reaction between the dissolved vanadium pentoxide and the metallic iron and/or lithium.

The rate of reaction is thought to be dependent on temperature and proceeds at a reasonable rate in the range of about 50° C. to about 90° C. A process of adding progressive amounts of vanadium pentoxide to a solution containing lithium hydroxide is more fully described in U.S. Pat. No. 5,039,582 which is incorporated in its entirety by reference herein.

After freeze-drying, the material may look like a big lump. However, the lump is very porous and easily disintegrates into constituent particles of the oxide. Thus, if the lump is touched with very little pressure, it crumbles. The porosity depends on the initial water content, higher water content results in higher porosity. Smaller particle size is probably also obtained with higher water content and an optimum between particle size and preparation rate is inevitable. However, the particle size of the material used in batteries should be less than 10 microns and preferably of sub-micron size and on the order of 0.1 micron.

Based on experience from freeze-drying experiments, it has been found that the water content may still be rather high. Therefore, it is necessary to heat treat the product or calcine it at a rather high temperature greater than about 200° C. and preferably on the order of 300° C. to 350° C. in order to get a high capacity, reversible electrode material. After freeze-drying, the product may still contain as much as 20% water, which can be gradually eliminated upon heat treatment. Material heat treated at 150° C. still may contain on the order of 4% water. Heat treatment at about 250° C. and on the order of 350° C. eliminates nearly all of the water.

The temperature of the reaction is not thought to be critical, however, the rate at which the reaction proceeds is temperature dependent. At higher temperatures, the reaction is faster. From a practical point of view, it is best to maintain the temperature at about room temperature, 15° C., or greater. It is possible to conduct the reaction at higher temperatures and, theoretically up to the boiling point of the mixture. Good results were achieved by conducting the reaction at 80° C. to 90° C. and as stated in Example 2 under reflux. The time to conduct the reaction was not determined exactly but normally excess time was allowed for. As stated, the time varies, as temperature increases, time decreases.

The recovered product of Examples 1 and 2 were used as active material for an electrochemical cell. The active material is operable with both liquid and solid, i.e., polymeric, electrolytes. Performance of the cell containing such cathode active material is as shown in the Figures. The method for preparing typical cells will now be described.

Preparation of Cathode and Cell

Figure 7:
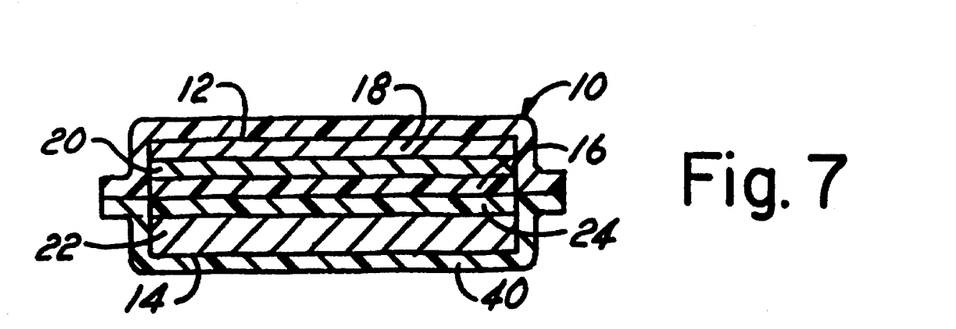
FIG. 7 is an illustration of a cross-section of a thin battery or cell embodying the invention.

The cathode active material of the invention is used to prepare cathodes for lithium based electrochemical cells. FIG. 7 shows an electrochemical cell or battery 10 which has a negative electrode (anode) side 12, a positive electrode (cathode) side 14, and an electrolyte or electrolyte/separator 16. In accordance with common usage, a battery may consist of one cell or multiple cells. The negative electrode is the anode during discharge, and the positive electrode is the cathode during discharge. The negative electrode side includes current collector 18, typically of nickel, stainless steel, and/or copper foil, and a body of negative electrode material 20. The negative electrode material 20 is sometimes simply referred to as the negative electrode or negative electrode composition. The negative electrode side 12 may consist of only a metallic electrode 20 without a separately distinguishable current collector 18. The positive electrode side 14 includes current collector 22, typically of aluminum, nickel, stainless steel, and/or copper foil, or such foils having a protective conducting coating foil, and a body of positive electrode material 24. The cathode composition 24 has a typical composition as set forth in Table III and includes the vanadates of the invention as the active material. The positive electrode material 24 is sometimes referred to as the positive electrode or positive electrode composition. The electrolyte 16 is typically a solid or liquid electrolyte. Suitable liquid or solid electrolytes are known with polymer electrolytes presently being favored. A variety of liquid, solid and polymer electrolytes are described in U.S. Pat. Nos. 4,009,052, 4,118,550, 4,792,504, 4,830,939, 4,990,413, 5,037,712, 5,229,225, 5,238,758, 5,262,253, 5,294,501, and 5,300,375 each of which is incorporated herein by reference in its entirety. The preferred electrolyte is a solid organic polymer matrix containing an ionically conducting powder or liquid with an alkali metal salt and the liquid is an aprotic polar solvent. Other electrolytes are liquid with dissolved metal salt usually used with a separator between the electrodes. Cell 10 also includes a protective covering (40) which functions to prevent water and air from contacting the reactive layers of the cell 10.

Cell 10 is preferably a laminar thin cell type including a lithium anode (negative electrode 20). Laminar thin-cell batteries containing lithium anodes are known in the art, and it will be appreciated that the cell can include various constructions such as bi-faced or bi-polar cell designs. Examples of cell constructions include a "jelly roll" or a fan folded laminate strip design as described in U.S. Pat. No. 4,879,190 incorporated herein by reference in its entirety.

Because the cell utilizes a lithium anode layer 20, it is necessary to manufacture the cell in a water (humidity) free environment. Lithium is extremely reactive with water and if reacted, a passivation layer can form on the surface of the anode layer, reducing the efficiency of the layer, and increasing cell impedance. Accordingly, it is particularly desirable to manufacture the cell in an environment having a relative humidity at room temperature of less than 2% (less than 300 ppm water). An environment containing between 1 ppm and 50 ppm water, and preferably less than 1 or 2 ppm water, produces a particularly efficient cell.

The Anode

The anode is typically comprised of a compatible anodic material which is any material which functions as an anode in a solid electrolytic cell. Such compatible anodic materials are well known in the art and include, by way of example, lithium, lithium alloys such as alloys of lithium with aluminum, mercury, tin, zinc, and the like, and intercalation based anodes such as carbon, tungsten oxides, conductive polymers such as polypyrrole, and the like. These are known in the art and are discussed in U.S. Pat. Nos. 4,517,265, 5,028,500, 5,238,758, 4,812,376, and 4,987,042 each of which is incorporated by reference herein in its entirety. Most preferred are light weight electropositive materials such as alkali metals and particularly lithium and sodium.

The Current Collector

The process of the invention forms a cathode composition 24 on the current collector 22 which may be a sheet of metal foil, an electrically conductive screen, grid, expanded metal, etched foil, electro-deposited film, woven or non-woven conductive fabric. In practice, it is preferred to use as the current collector a thin metal foil having a metal, preferably the same metal, electro-deposited on the surface thereof which will contact the cathode layer. A preferred metal is known as surface-treated roughened nickel available from Fukuda Metal Foil and Powders Co., Ltd., Kyoto, Japan, and specified as CF18NiT. A micro-roughened or etched surface on the current collector 22 enables better adherence of the cathode composition 24 to the current collector.

In practice, the thickness of current collector 22 ranges from about 5 microns to about 25 microns. Preferably, the current collector is as thin as practicable. Alternatively, the current collector can take the form of a thin polymeric film having coated thereon an electrically conductive metal. The advantage of this current collector is that it is extremely light-weight and can be utilized in extremely thin layers. An example of such a material is a polyethylene terephthalate substrate having electro-deposited thereon a first layer of copper and a second layer of nickel. The thickness of such a layer is typically on the order of about one micron in magnitude but it may be as thin as practicable to minimize overall thickness of the cell. Another configuration is a metallic conductive substrate with a conductive polymer protective layer between the substrate and the active material such as in U.S. Pat. No. 5,262,254 incorporated herein by reference in its entirety.

The Cathode Composition

Various cathode compositions are known in the art. Such compositions are presently prepared in conventional process with or without benefit of dilution with a volatile casting solvent. Such conventional compositions are typically a highly viscous paste or gel applied onto the micro-roughened surface of current collector 22. In one embodiment, cathode composition 24 is combined with the volatile casting solvent of the invention and applied to a current collector 22. The cathode composition alone (not including the volatile solvent) comprises the following typical components:

1) an active cathodic material such as the intercalation compound of the invention;

2) an electrically conductive filler or an electrically conductive polymer such as polypyrrole, polyacetylene, polyaniline, etc.; and 3) an ionically-conductive electrolyte (described below).

The electrically conductive filler is often graphite, carbon black, acetylene black, or the like, often referred to as carbon powder or carbon particles, and generally referred to as carbonaceous material. An example is carbon powder from Chevron Chemical Co., San Ramon, Calif. sold under the trade name Shawinigan Black, having a BET surface area of about 100 square meters per gram ($m^2/g$). Other fillers are metal particles, particularly powdered nickel. Certain conductive polymers (which are characterized by a conjugated network of double bonds) like polyaniline, polythiophene, polypyrrole and polyactylene may also be used for the electrically conductive filler.

The Active Material

The active cathode material of the invention preferably has a particle size of less than 1 micron but can range up to 20 microns. A particularly preferred particle size is less than 5 microns, and particularly less than 1 micron. It is preferred that the active material comprise between 15% and 85% by weight of the entire cathode composition, desirably 25% to 65%, and preferably between 45% and 55%.

It is particularly desirable to maintain good contact between the cathode material and the carbon particles while maximizing the amount of cathode material available for ionic interaction. If an excess of carbon is present which does not significantly improve electrical conductivity then it reduces capacity due to the reduced amount of intercalation compound present.

The optimum ratio of carbon to active material will vary with particle size and processing or grinding techniques used. The carbon black and active material are ball-milled together. It is preferred that part of the carbon be included for the milling. The rest may be added later. If too much carbon is present, the cathode composition may have a sand-like consistency.

The ionically conductive electrolyte comprises from about 25% to 85% by weight of the cathode composition, preferably 35% to 75% by weight.

The Conductive Electrolyte

The third component of the cathode composition is the ionically conductive electrolyte. The electrolyte is also used as the transport layer 16 between the anode and cathode. The same electrolyte may be used in the cathode as in the layer 16. This material is typically prepared from a composition which comprises a liquid, monomeric or prepolymeric polymerizable compound, and a solution of an ionizable alkali metal salt, or solid alkali metal salt, or solid ionically conductive powders which are maintained in the ionically conductive polymer matrix. Suitable compositions are as described in U.S. Patents which were earlier incorporated herein by reference in their entirety.

The ionically conductive polymer is often simply referred to as an electrolyte or electrolyte/binder. It should be noted that the electrolyte/binder described herein is usable for the anode composition, the cathode composition, and for the electrolyte separator 16 disposed between the negative and positive electrode compositions 20 and 24. Accordingly, the properties of the electrolyte/binder (e/b) polymer are described with reference to all uses in various patents. U.S. Pat. Nos. 4,009,052 and 4,118,550 show electrolytes in the form of flat porous mats made of microporous films or fibers with suitable solvents used for electrolyte. U.S. Pat. Nos. 4,792,504 4,830,939, 4,990,413, and 5,037,712 show solid polymeric electrolytes comprising a continuous network of crosslinked polymeric structure containing an ionically conducting liquid for use in electrochemical cells. Examples include polymers having repeating units containing at least 1 heteroatom such as an oxygen or nitrogen atom as described in these patents, incorporated by reference in their entirety. U.S. Pat. No. 5,229,225 shows a solid electrolyte having solvent ligands and polymer ligands coordinated with metal ion. U.S. Pat. No. 5,262,253 shows solid electrolytes containing a solid polymeric matrix derived from vinyl sulfonate polyalkylene oxides. U.S. Pat. No. 5,294,501 shows a single solid phase solvent containing electrolyte having recurring units derived from silane acrylate incorporated within the solid polymeric matrix of the solid electrolyte. U.S. Pat. No. 5,238,758 shows an interpenetrating polymeric network containing a liquid electrolyte for use in a cell which comprises a suitable salt, various suitable organic and inorganic salts are also described in the other patents incorporated herein by reference, as well suitable solvents for the salts. U.S. Pat. No. 5,300,375 describes a single phase solid solvent containing electrolyte having recurring units derived from a novel acrylic alkoxy substituted silane incorporated within the solid polymeric matrix of the solid electrolyte.

The electrolyte composition typically comprises from about 5 to 25 weight percent of an inorganic ion salt based on the total weight of the electrolyte; preferably, from about 10 to 20 weight percent; and even more preferably about 15 weight percent.

The electrolyte composition typically comprises from about 40 to 80 weight percent solvent (e.g., organic carbonate/glyme mixture) based on the total weight of the electrolyte; preferably from about 60 to about 80 weight percent; and even more preferably about 70 weight percent.

The solid electrolyte composition typically comprises from about 5 to 30 weight percent of the solid polymeric matrix based on the total weight of the electrolyte; preferably from about 10 to about 20 weight percent; and even more preferably 17 weight percent.

One radiation curable polymer composition contains polyethylene oxide (PEO), polyethylene glycol diacrylate, (PEG-DA), trimethylolpropane ethoxylated triacrylate (TMPEOTA), $LiCF_3SO_3$ and a suitable ionic conductive solvent such as tetraglyme or propylene carbonate (PC).

Cells can be prepared with a variety of electrolytes, current collectors and cathode compositions. The anode is typically metallic lithium. Table contains one exemplary cathode composition. The cathode composition is typically a highly viscous paste or gel applied onto the micro-roughened surface of current collector 22. In one embodiment, cathode composition 24 is paste-like in consistency and includes the vanadate active cathodic material and an electrically conductive carbon filler; and an ionically-conductive electrolyte.

TABLE III

| Typical Cathode Composition | Percent Weight |
| --- | --- |
| Active Material | 45.0 |
| Carbon | 10.0 |
| Propylene Carbonate (PC) | 33.0 |
| PolyEthylene Oxide (PEO) | 1.0 |
| PolyEthyleneGlycolDiAcrylate (PEGDA) | 9.0 |
| TriMethylPolyEthylene Oxide TriAcrylate (TMPEOTA) | 2.0 |

The cathode composition containing the active material of the invention was coated onto metal foil, followed by curing. Curing refers to the treatment of the solid matrix-forming precursors under polymerization conditional (including cross-linking) so as to form a solid polymeric matrix or network.

Curing

The electrode composition is partially or totally cured by exposure to actinic radiation, heating, or by utilizing a chemical polymerization method. It has been found that, in the case of a typical cathode composition, exposure to an electron beam operating at a power of 3 to 9M rad is useful. Alternatively, an ultraviolet source may be selected. If an ultraviolet source is selected, the monomer preferably includes an ultraviolet initiator of the type commonly known in the art such as thioxanthone initiators. Similarly, if thermal curing is selected, the composition should include a thermal initiator. Curing polymerizes and cross-links and thereby solidifies the monomeric material by conversion to a polymeric form.

A partial curing step (as opposed to full curing) may be particularly desirable as this enables the cathode layer to remain somewhat tacky when the electrolyte layer is applied. This enables better adherence between the layers.

Electrolyte Application

The aforementioned steps provide an electrode composition ready for application of an electrolyte. It should be noted that the electrolyte composition 16 may be applied onto an electrode composition, such as the cathode composition, either before or after total or partial curing of the electrode and electrolyte.

The electrolyte can be extruded and coated in a very thin layer typically ranging from about 5 to about 50 microns. When the electrolyte 16 is coated onto the cathode composition 24, it is coated in an uncured viscous and often substantially liquid state. It completely covers the cathode composition layer to prevent protrusion of cathode composition components through the electrolyte layer.

The preparation time described in the invention ranged up to a number of days. It is thought that this preparation time may be reduced significantly. During preparation it is thought that part of the vanadium pentoxide is dissolved but presumably not all of it especially if higher concentrations are used. If the concentration of vanadium pentoxide in the aqueous mixture is too high the gel solidifies completely. It is best to stir the constituents during reaction. Stirring really depends on concentrations. It was found that a stirring rate of 1 to 30 rotations per minute relatively continuously is advisable. Although relatively close stoichiometric quantities of the constituents were used in the reaction, it is believed that within a relatively narrow range, excess of one or another constituent may be used. The color of the solution gradually changes during the gelling reaction and determination of when the reaction is finished may be based solely on the experimenter's observation of a visible change of color. The calcining step may be monitored by weight changes, powder x-ray diffraction measurements, chemical analysis, and the like. Calcining removes essentially all of the water, typically crystal water, which is chemically bound in the oxide structure. During this step the material crystallizes. It is typically more or less amorphous prior to the calcining process. For vanadium oxides water is typically released at a temperature above 270° C. The process is reasonably fast at about 350° C. Reaction (calcining) times are in the range of 6 to 30 hours. The freeze-drying step, if conducted effectively, eliminates most of the water. This step is as simple as spreading the gel solution over a surface in a layer which is about ½ inching thick and cooling it down to less than −20° C. When the material is evacuated (pressure drop) water sublimes, the temperature drops further, and then it is possible to accelerate the sublimation rate by heating the material. The material obtained from freeze-drying is normally large porous lumps which are easily reduced or friable to a powder. Some mechanical grinding or similar process may be needed to further reduce particle size. It is preferred that the particle size be in a range of 0.1 to 10 microns and preferably on the order of 1 micron or less. It is thought that a factor which contributes to performance of the active material is the average particle size which is why the sizes in the range as stated above are preferred. Advantageously, the preferred particle size is achievable either without grinding or with very little grinding. While not wishing to be held to any particular theory, it is thought that the Fe and Fe/Li vanadates of the invention do not have a structure similar to the alkali metal trivanadates. Alkali metal trivanadates $MV_3O_8$, such as $LiV_3O_8$, $NaV_3O_8$, and $KV_3O_8$ are known and are thought to be different from $FeV_3O_8$ which likely corresponds to $(Fe_{1/4}V_{3/4})O_2$. The exact structure of the product of the invention is not yet fully understood. The invention provides iron containing vanadates and lithium iron containing vanadates having high purity, and good energy, power, and cycling capability. The process of the invention is efficient and adaptable to production of large quantities of active material in the manufacturing setting with good conversion yields of product in the starting materials.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

We claim:

1. A process for preparing an oxide of vanadium comprising the steps of:

a) preparing a mixture comprising a liquid, metallic iron particles and vanadium pentoxide containing vanadium in the V(5) state;

b) reacting the metallic iron with the vanadium pentoxide in the presence of oxygen to change at least a portion of the V(5) to a V(4) state and to form a gel containing said vanadium in the V(4) state; and c) separating the liquid from the oxide-based gel to provide a solid material comprising iron (Fe), vanadium (V), and oxygen (O), while maintaining at least a portion of said vanadium in the V(4) state.

2. The process according to claim 1 wherein the metallic iron is present in the reaction mixture of step (a) in an amount which reacts with said V(5) in the mixture to provide said gel having at least a 50% portion of said vanadium in the V(4) state.

3. The process according to claim 1 wherein the ratio of vanadium pentoxide to iron in the mixture is approximately 1 mole of iron for every 1½ moles of vanadium pentoxide.

4. The process according to claim 1 wherein the liquid is water and step (c) is conducted by freeze-drying by cooling the water to a temperature below its freezing point under subatmospheric pressure for a time sufficient to remove at least a major portion of the water.

5. The process according to claim 4 wherein said freeze-drying is conducted at a temperature of about −10° C. or less.

6. The process according to claim 4 wherein said freeze-drying is followed by calcining.

7. The process according to claim 6 wherein said calcining is at a temperature of at least about 200° C.

8. The process according to claim 1 wherein the solid material comprises said Fe, V, and O in relative atomic amounts of about 1 Fe to about 3 V to about 8 O (Fe:V:O of about 1:3:8 ).

9. The process according to claim 1 wherein the reaction is conducted at a temperature of about 50° C. to about 90° C.

10. The process according to claim 1 wherein the source of oxygen is from water or air.

11. A process for preparing an oxide of vanadium comprising the steps of:
  a) preparing a mixture comprising a liquid, metallic iron particles, vanadium pentoxide containing vanadium in the V(5) state, and lithium hydroxide;
  b) reacting the metallic iron, the vanadium pentoxide, and the lithium hydroxide to change at least a portion of the V (5) to a V (4) state and to form a gel containing said vanadium in the V (4) state; and
  c) separating the liquid from oxide-based gel to provide a solid material comprising iron (Fe) , lithium (Li), vanadium (V) , and oxygen (O) , while maintaining at least a portion of said vanadium in the V (4) state.

12. The process according to claim 11 and further comprising after step (c), electrochemically oxidizing said solid material by full or partial electrochemical charge to remove at least a portion of said lithium.

13. The process according to claim 11 wherein the solid material comprises said Fe, Li, V, and O in relative atomic amounts of about 1 Fe to about 1 Li to about 3 V to about 8 O (Fe:Li:V:O of about 1:1:3:8).

14. The process according to claim 11 wherein the ratio of vanadium pentoxide to iron in the mixture is approximately 1 mole of iron for every 1½ moles of vanadium pentoxide.

15. The process according to claim 11 wherein the liquid is water and step (c) is conducted by freeze-drying by cooling the water to a temperature below its freezing point under subatmospheric pressure for a time sufficient to remove at least a major portion of the water.

16. The process according to claim 11 wherein said freeze-drying is conducted at a temperature of about −10° C. or less.

17. The process according to claim 11 wherein said freeze-drying is followed by calcining.

18. The process according to claim 11 wherein said calcining is at a temperature of at least about 200° C.

19. The process according to claim 11 wherein the $V_2O_5$ and the LiOH are mixed together in the liquid and then the Fe is added.

20. The process according to claim 11 wherein the reaction to form a gel is conducted under protective atmosphere inert to the reactants.

21. The process according to claim 11 wherein the reaction is conducted at a temperature of about 50° C. to about 90° C.

* * * * *